United States Patent [19]

Sixsmith

[11] 4,430,101
[45] Feb. 7, 1984

[54] SEPARATOR BLADES FOR MIST ELIMINATORS

[75] Inventor: Richard Sixsmith, Mississauga, Canada

[73] Assignee: Plasticair Systems 442829 Ontario Inc., Mississauga, Canada

[21] Appl. No.: 336,528

[22] Filed: Dec. 31, 1981

[51] Int. Cl.³ .............................................. B01D 45/08
[52] U.S. Cl. ................................................... 55/440
[58] Field of Search ........................... 55/440, 257 PV

[56] References Cited

U.S. PATENT DOCUMENTS

| | | | |
|---|---|---|---|
| 2,479,625 | 8/1949 | Kimmell | 55/440 |
| 3,748,832 | 7/1973 | Furlong et al. | 55/440 X |
| 3,849,095 | 11/1974 | Regehr | 55/440 X |
| 3,870,488 | 3/1975 | Arndt et al. | 55/440 |
| 3,953,183 | 4/1976 | Regehr | 55/440 |
| 3,977,977 | 8/1976 | Kall | 55/440 X |
| 4,251,242 | 2/1981 | Ito | 55/440 X |

FOREIGN PATENT DOCUMENTS 2715451  10/1978  Fed. Rep. of Germany ........ 55/440

*Primary Examiner*—Kathleen J. Prunner
*Attorney, Agent, or Firm*—Hirons, Rogers & Scott

[57] ABSTRACT

The invention provides a separator blade for a mist eliminator of the kind comprising a plurality of parallel blades providing corresponding flow passages that change direction. A first direction change occurs immediately upon entry to the flow passage so that droplets are deposited on the blade front face. This part of the front face terminates in a primary collecting channel formed by a hook-like member protruding into the passage. The outer face of this hook-like member is convex curved and forms a venturi throat with the facing rear face of the adjacent blade. The blade is shaped to change the passage direction immediately after the throat and to provide an impingement surface at right angles to the gas flow that leads immediately into a secondary collecting channel formed by a respective hook-like member protruding into the passage from the rear face. Each rear face after the secondary channel is smoothly convex curved and leads to a tertiary collecting channel at the exit part, the face being provided with a plurality of spaced parallel longitudinal ribs that facilitate agglomeration of the fine droplets. Both the leading and trailing edges are thickened to give additional rigidity in a manner that minimizes turbulence in the gas flow.

14 Claims, 6 Drawing Figures

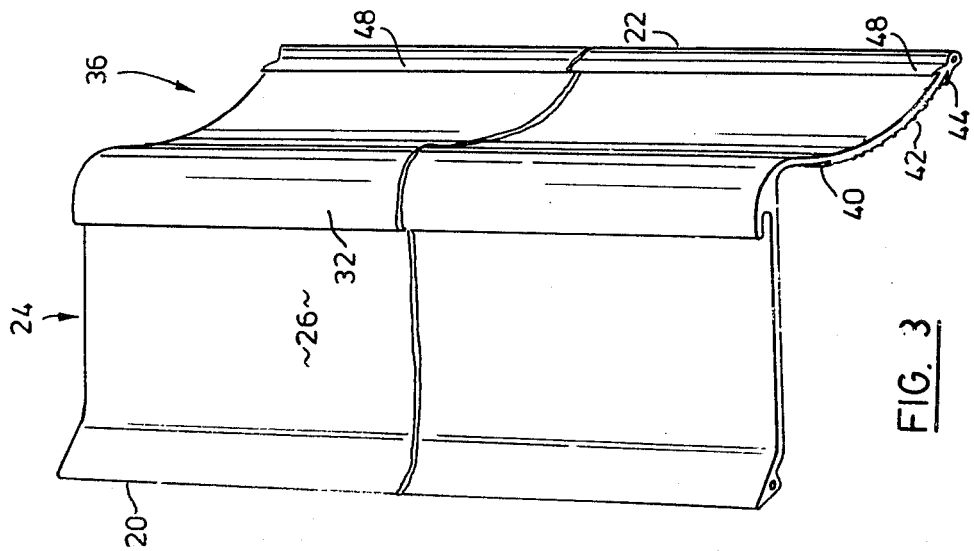
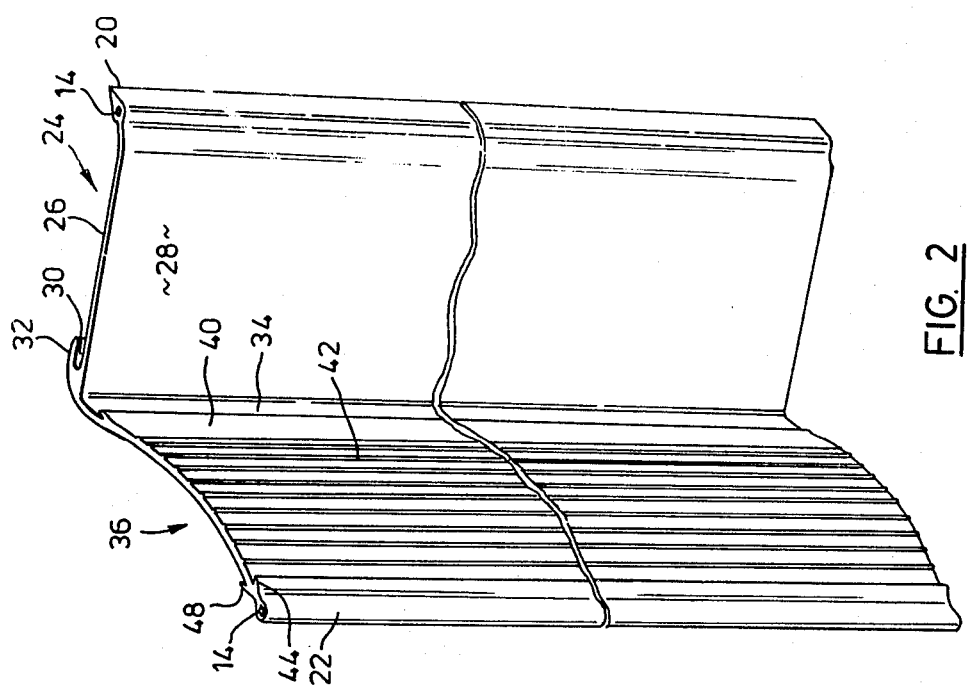
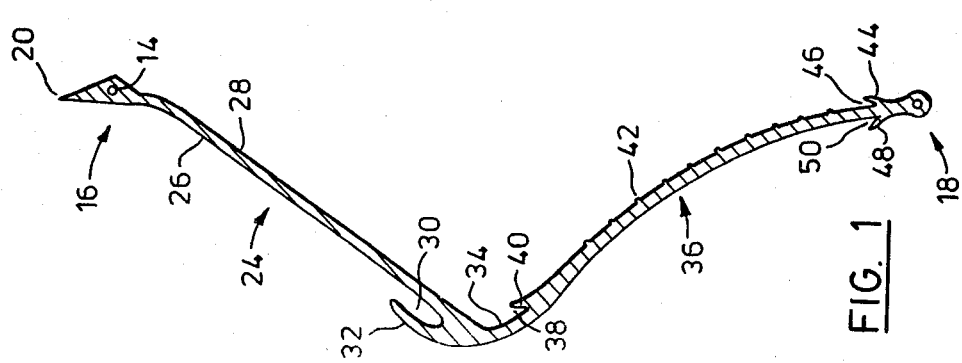

SEPARATOR BLADES FOR MIST ELIMINATORS

FIELD OF THE INVENTION

The present invention is concerned with improvements in or relating to separator blades for mist eliminators.

REVIEW OF THE PRIOR ART

The need to separate droplets of a liquid from a moving gas stream exists in many industries and in many different types of apparatus. To this end a common procedure is to pass the gas stream through a set of parallel passages formed between so-called separator blades, these passages changing direction one or more times so that the liquid droplets, which tend to follow a straighter path, will impinge against the blade walls and thereby become separated from the stream. The separation of droplets of relatively large size i.e. above 0.05 mm (50 microns) in this manner is not particularly difficult, but considerable difficulty is experienced with very small droplets, i.e. below 0.005 mm (5 microns) because they are very much less affected by the direction changes, and more readily return to the gas stream if they are not quickly agglomerated with other small droplets to form a single droplet of larger size. These smaller droplets may however constitute a significant fraction of the liquid content of the gas stream. The design of a blade to give adequate separation of such small particles is therefore surprisingly difficult.

Until the advent of plastics materials of economical cost the materials normally used for mist eliminator blades were metal or wood. For economy the metal was usually thin sheet steel, usually protected against the corrosive effect of the hot moist gas stream by galvanizing. In some applications the liquid itself is highly corrosive so that galvanised metal blades have too short a life to be economical. Suitable alternative materials are plastic, aluminum and aluminum alloys, and the blades can then be made by extrusion, permitting the production of relatively complex profiles, but difficulty is still experienced in the design of the blades, because of the relatively low tolerances of conventional extrusion processes.

DEFINITION OF THE INVENTION

It is therefore an object of the invention to provide a mist separator blade of profile that makes it particularly suited for separation and collection of small liquid droplets from a gas stream.

It is another object to provide such a blade that is particularly suited for production by an extrusion process.

In accordance with the present invention there is provided a separator blade assembly for a mist eliminator comprising:

a plurality of separator blades disposed parallel to one another to form a respective gas flow passage between each immediately adjacent pair of blades, each blade consisting of an elongated body having a front face and a rear face, whereby in a mist eliminator containing the blade assembly each gas flow passage is formed between a respective blade front face and the facing rear face of the immediately adjacent blade, each blade comprising in the order stated in the direction of gas flow in the respective gas flow passages at least an entry part including a leading edge, a first droplet impingement part, a primary collection channel, a blade junction, a second droplet impingement part, and an exit part including a trailing edge, each blade entry part being inclined at an angle to the subsequent first droplet impingement part of the blade to cause a corresponding change in direction in the respective flow passages, the portion of the front face of the first droplet impingement part between the entry part and the primary collection channel constituting a respective first droplet impingement part front face, each first droplet impingement part front face terminating at the primary collection channel which is formed by a channel-forming hook-like projection protruding from the blade front face into the respective gas flow passage, the outer face of each channel-forming hook-like projection being outwardly convex curved so as to cooperate with the said facing blade rear face of the adjacent blade to form a venturi throat in the respective flow passage, each blade having the second droplet impingement part inclined at an angle to the first droplet impingement part at the said blade junction so as to cause a corresponding change in direction in the respective flow passage at the said junction downstream of the respective venturi throat, the rear face of the second impingement part constituting a respective second droplet impingement part rear face, the second droplet impingement part having a portion of its rear face immediately following the said blade junction disposed so as to be approximately at right angles to the direction of gas flow through the respective venturi throat for corresponding impingement of the gas flow thereon, the said second droplet impingement part rear face portion terminating in a secondary droplet collection channel formed by a channel-forming hook-like projection protruding from the rear face into the respective flow passage.

DESCRIPTION OF THE DRAWINGS

A mist eliminator separator blade that is a particular preferred embodiment of the invention will now be described, by ways of example, with reference to the accompanying diagrammatic drawings wherein:

FIG. 1 is a transverse plane cross-section through a single blade,

FIGS. 2 and 3 are perspective views to show the so-called rear and front faces respectively.

DESCRIPTION OF THE PREFERRED EMBODIMENTS

Figure 4:
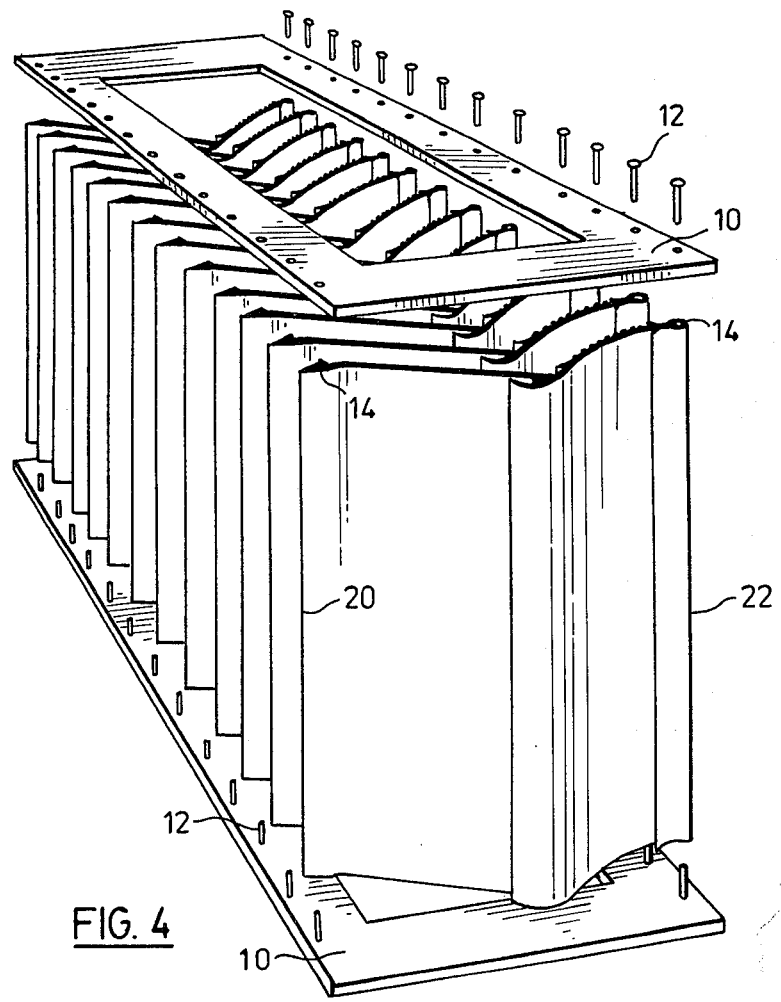
FIG. 4 illustrates how a plurality of the blades are assembled together to form a mist eliminator.

FIG. 4 shows one way in which a plurality of mist eliminator blades of the invention can be mounted between two end frames 10 so as to be parallel to one another and form a respective plurality of gas flow paths between them. Thus, the blades are fastened at their ends to the respective frame by pins such as 12 that enter corresponding bores 14 in the blade leading and trailing ends. In another method which is not illustrated the end frames 10 are of fibre-reinforced resin applied directly to the ends of the blades while they are held securely in a jig, so that upon removal of the jig the blades are held rigidly accurately spaced from one another. The exact method by which the blades are mounted is not important to this invention and other methods will be apparent to those skilled in the art.

Each blade has an entry part 16 and an exit part 18 in which the bores 14 are formed. The entry and exit parts are considerably thicker than the remainder of the blade to give corresponding additional rigidity to the leading edge 20 and trailing edge 22 respectively. This additional rigidity, particularly of the leading edge 20, is found to be important in maintaining accurately the spacing between the edge when the blades are made of plastic by an extrusion process. Moreover, it is desired to provide a leading edge that is as close as possible to a sharp knife edge, so as to minimize pressure drop through the eliminator, and a blade edge that is not reinforced in this manner is found to vibrate unduly under the effect of the gas flow, leading to inefficiency of separation as well as increased noise. It will be noted that the thickening of the leading edge is provided by a protrusion from the rear face of the blade since at this part of the blade it is the front face that is the droplet collecting face, and a sudden change in profile of that face is undesirable. The thickening at the exit part is symmetric about the bore 14 and is smoothly rounded to minimise turbulence.

Each entry part is inclined at a substantial angle, about 150 degrees in this embodiment, to a following first droplet impingement part 24 constituted by straight flat parallel front and rear faces 26 and 28 respectively. The change of direction causes droplets to move relative to the direction of gas flow toward the front face 26, where they have the opportunity of coalescing or agglomerating with other droplets until the resulting larger droplets run down the blade to collect at the bottom in a sump which is not shown.

The deposited droplets aso move along the blade face under the action of the gas flow until they enter a downwardly-extending primary collection channel 30 constituted by a hook-like projection 32 extending from the front face into the flow channel toward the facing rear face of the other blade. The exterior shape of the projection 32 is important and it will be noted that it is smoothly convex curved with the result that it cooperates with the facing rear wall to form a venturi throat in which the velocity of the gas stream is considerably increased.

The increased velocity gas stream is now immediately directed at a substantially flat portion 34 of the rear face that is approximately at a right angle to the direction of gas flow, while at the same time the passage abruptly changes direction because of the inclination between the first droplet impingement part 24 and the second droplet impingement part 36 at the junction between these two parts. The rear face portion 34 immediately follows this junction and terminates downstream in a secondary droplet collection channel 38 formed by a hook-like projection 40 extending from the rear face 28 into the passage toward the facing front face. The resulting structure gives a high probability that even the smaller droplets will impinge on the surface 34 and collect in the channel 38 to agglomerate and drain to the sump.

The rear face 28 of the second impingement part now constitutes the principal droplet impingement face and this is smoothly convex curved to increase the probability of droplets impinging thereon. Droplets of a size sufficiently small to pass the collection channels 30 and 38 have difficulty in agglomerating and there is a high probability that they can be removed from the surface and re-enter the gas stream, especially if that stream has any substantial degree of turbulence. The face is therefore provided with a plurality of relatively closely-spaced parallel shallow longitudinally-extending ribs or projections such as 42 against which the droplets can collect. These ribs are however of smoothly convex shape and of minimum required height so as to minimize production of turbulence in the gas flow.

Each second impingement part terminates at its junction with the exit part 18 in a tertiary collection hook 44 forming a respective tertiary collection channel 46 which extends from the rear face into the flow channel toward the facing front face. The demisted gas then exits past the bulbous trailing edge 22. The front face is also provided with a respective tertiary collection hook 48 forming a channel 50, but will not receive as much liquid as the channel 46.

Figure 5:
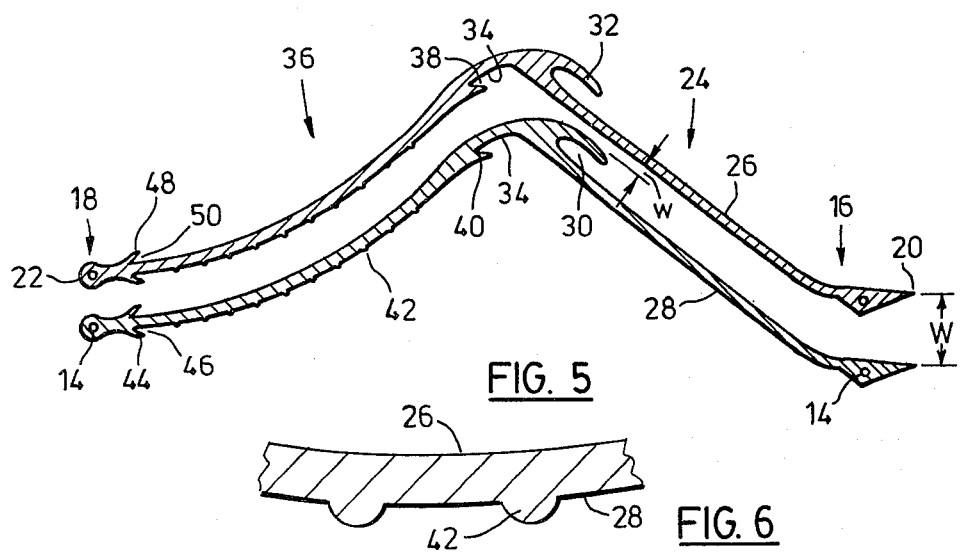
FIG. 5 is a transverse plane cross-section through two parallel blades to show the manner in which the front face of one blade cooperates with the rear face of the immediately adjacent blade to form a gas flow passage between them.
Figure 6:
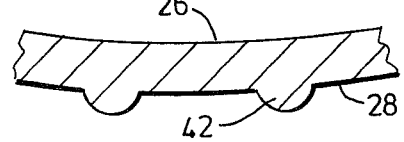
FIG. 6 is a cross-section to an enlarged scale through a portion only of a second droplet impingement part of a blade to show the profile of convex projections from the rear face thereof.

A typical blade for use in mist eliminators intended to operate with gas velocities of about 325 to 750 m.p.m. (1000–2500 f.p.m.) will have an overall length in the direction of the flow path of about 20 cm (8 inches) and can vary in height from about 7.5 cm to 250 cm (3 to 100 inches). The spacing between immediately adjacent blades is normally about 16 mm (0.625 inch) at the entry and exit and the protrusion of the hook projection 32 into the respective channel is such that the ratio between the entry throat width W (FIG. 5) and the venturi throat width w is between 1:4 and 1:5. This ratio should be at least 1:3.5 for effective operation and is determined most easily by adjustment of the blade spacing. A ratio much higher than 1:5 requires such a close spacing of the blades that the pressure drop increases to an uneconomic value. Suitable materials for fabrication of the blades are high density polyethylene, aluminum and aluminum alloys in any of their extrudable forms. An eliminator fabricated using polyethylene blades achieved a collection efficiency of about 92% for droplets of about 1 micron size with a pressure drop through the eliminator of only 2.75 cm $H_2O$ (1.1 inch).

I claim:

1. A separator blade assembly for a mist eliminator comprising:

a plurality of separator blades disposed parallel to one another to form a respective gas flow passage between each immediately adjacent pair of blades, each blade consisting of an elongated body having a front face and a rear face, whereby in a mist eliminator containing the blade assembly each gas flow passage is formed between a respective blade front face and the facing rear face of the immediately adjacent blade, each blade comprising in the order stated in the direction of gas flow in the respective gas flow passages at least an entry part including a leading edge, a first droplet impingement part, a primary collection channel, a blade junction, a second droplet impingement part, and an exit part including a trailing edge, each blade entry part being inclined at an angle to the subsequent first droplet impingement part of the blade to cause a corresponding change in direction in the respective flow passages, the portion of the front face of the first droplet impingement part between the entry part and the primary collection channel constituting a respective first droplet impingement part front face, each first droplet impingement part front face terminating at the primary collection channel which is formed by a channel-forming hook-like projection protruding from the blade front face into the respective gas flow passage, the outer face of each channel-forming hook-like projection being outwardly convex curved so as to cooperate with the said facing blade rear face of the adjacent blade to form a venturi throat in the respective flow passage, each blade having the second droplet impingement part inclined at an angle to the first impingement part at the said blade junction so as to cause a corresponding change in direction in the respective flow passage at the said junction downstream of the respective venturi throat, the rear face of the second impingement part constituting a respective second droplet impingement part rear face, the second droplet impingement part having a portion of its rear face immediately following the said blade junction disposed so as to be approximately at right angles to the direction of gas flow through the respective venturi throat for corresponding impingement of the gas flow thereon, the said second droplet impingement part rear face portion terminating in a secondary droplet collection channel formed by a channel-forming hook-like projection protruding from the rear face into the respective flow passage.

2. A separator blade assembly as claimed in claim 1, wherein each said second droplet impingement part rear face is provided downstream of the secondary droplet collection channel with a plurality of spaced, parallel protruding longitudinal ribs against which droplets can agglomerate.

3. A separator blade assembly as claimed in claim 2, wherein each said rib is of smoothly convex shape protruding outwardly from said second droplet impingement part rear face to minimize production of turbulence in the gas flow.

4. A separator blade assembly as claimed in claim 2, wherein the front face of each second droplet impingement part is smooth to minimize production of turbulence in the gas flow.

5. A separator blade assembly as claimed in claim 1, wherein the entry part of each separator blade immediately following the leading edge is thickened by a protrusion from the blade rear face so as to increase the rigidity of the entry part while maintaining a thin leading edge.

6. A separator blade assembly as claimed in claim 1, wherein the exit port of each separator blade immediately before the trailing edge is thickened by a protrusion from the blade front face so as to increase the rigidity of the exit part while minimizing production of turbulence in the gas flow.

7. A separator blade assembly as claimed in claim 6, wherein the exit part of each separator blade immediately before the trailing edge is thickened by symmetric protrusion from both the front and rear faces of the exit part.

8. A separator blade assembly as claimed in claim 1, wherein each blade second impingement part is provided downstream of the secondary droplet collection channel with at least one tertiary droplet collection channel formed by a channel-forming hook-like projection protruding from the blade rear face.

9. A separator blade assembly as claimed in claim 8, wherein the hook-like projection forming the said tertiary channel is provided at the junction of the second impingement part with the exit part.

10. A separator blade as claimed in claim 9, wherein each blade has a second tertiary droplet collection channel formed by a channel-forming hook-like projection protruding from the respective front face at the junction of the second impingement part with the exit part.

11. A separator blade assembly as claimed in claim 1, wherein the second impingement part front and rear faces of each blade are parallel with the front face being concave curved and the rear face being convex curved.

12. A separator blade assembly as claimed in claim 11, wherein the first impingement part front and rear faces of each blade are parallel and substantially flat.

13. A separator blade assembly as claimed in claim 1, wherein the entry parts define flow passage entry throats in the respective flow passages, and the spacing of the blades from one another is such that the ratio of entry throat width to venturi throat width is at least 1:3.5.

14. A separator blade assembly as claimed in claim 13, wherein the said ratio is between 1:4 and 1:5.

* * * * *